Patented Jan. 5, 1943

2,307,399

UNITED STATES PATENT OFFICE 2,307,399

PROCESS FOR THE PRODUCTION OF COLORED PHOTOGRAPHIC IMAGES WITH DYESTUFF FORMERS FAST TO DIFFUSION

Alfred Fröhlich and Wilhelm Schneider, Dessau, Germany, assignors to General Aniline & Film Corporation, New York, N. Y., a corporation of Delaware No Drawing. Application April 3, 1940, Serial No. 327,628. In Germany March 24, 1939

9 Claims. (Cl. 95—6)

This invention relates to the manufacture of photographic color images by means of dyestuff formers fast to diffusion.

It is known to employ for the manufacture of photographic color images silver halide emulsions containing dyestuff formers fast to diffusion, which are added in soluble form to the photographic silver halide emulsion and cannot be removed therefrom by washing. Such dyestuff formers fast to diffusion are obtained from simple dyestuff components by introducing certain substances which prevent diffusion. Carbon chains with more than 5 carbon atoms have been proposed amongst others as substituents preventing diffusion. Into these dyestuff components, moreover, there were introduced groups effecting solubility in water like sulfo- or carboxyl groups, in order to render the dyestuff components water soluble and to facilitate the incorporation into the emulsion and to hinder as well the crystallization before and after the process.

Instead of these carbon chains, resins, bile acids and the like may be bound to the molecule of the dyestuff component. Moreover, it is proposed to introduce substituents having several members in which apart from the first and last links of the chain the same hydrocarbon arrangements exist several times and are connected by hetero atoms. In this case for instance a chain consisting of ethyleneoxide is connected with the molecule of a dyestuff former either by direct polymerization of ethyleneoxide or its homologs onto a dyestuff-forming preliminary product, or the dyestuff former is connected with a suitable intermediate product carrying a chain-substituent consisting for instance of polyethyleneoxide.

A group suitable for reaction with dyestuff formers may be introduced into such a polymeric carbon arrangement, interrupted by hetero atoms, in some special cases, for instance into polyvinylchloride or into polymeric epibromhydrine by an after-treatment, for instance with ammonia. The latter method, however, has the disadvantage that the exchange of halogen atoms for amino groups is very difficult in these polymers as known by experience and that it leads to further net-formation of the polymerisate and with it to compounds of very variable solubility.

It is an object of this invention to provide photographic color images.

Another object is to provide dyestuff formers fast to diffusion for the production of photographic color images.

These and other objects will become apparent from the detailed specification following hereinafter.

It has been found that certain nitrogenous polymerisates are suited to react directly with dyestuff formers, since the amino groups present in the polymerisate are still able to react with suitable molecules of dyestuff formers, i. e. α-oxynaphthoic acid chloride in such a way, that dyestuff components fast to diffusion towards gelatin are obtained. The amino groups of the polymerisates which are present before the polymerization in the monomeric starting material or are formed during the polymerization from amidation agents, participate for the most part in the polymerization (as links of the chain causing net-formation) by formation of secondary amino groups. Our invention makes it possible to employ polymerisates containing nitrogen atoms with at least one reactive hydrogen atom, directly and without any aftertreatment and to obtain thereby dyestuff molecules fast to diffusion. Obviously it is a great advantage to be able to use directly the polymerisates, the polymerization degree of which is determined by the way in which the polymerization is thus directed. There is avoided complicated after treatments and the originally desired properties of the polymerisates are not changed uncontrollably by decomposition or further net-formation.

Also such polymerisates are within the scope of this invention which contain nitrogen atoms with reactive hydrogen atoms, wherein the nitrogen was present wholly or in part in one of the monomeric compounds intended for polymerization or was formed during the polymerization in the polymerisate by adding amidation agents.

Such polymerisates are for instance polyethyleneimine and its homologs, the condensation products from aldehydes and di- or polyamines, as for instance methyleneurea and methylolurea or polymerisates containing a mixture of these two kinds of formaldehydeurea condensates being commercially used under various names as glue, lacquer substitute, thermoplastic compounds and the like. Also the polymerisates from thiourea and aldehydes belong hereto. Furthermore belong hereto: polymerisates and condensates known as superpolyamides such as those from aliphatic polycarboxylic acids with aliphatic and aromatic polyamines or with aromatic or aliphatic amino carboxylic acids. Such compounds are represented for instance by the reaction products of diamines with dicarboxylic acids, as for instance the polymerisate from sebacic acid and octylenediamine or from adipic acid with hexamethylenediamine.

Also within the scope of this invention are other superpolyamides, which are obtained by heating amino carboxylic acids under polyanhydride formation and, if necessary, by adding catalysts. Such compounds are obtained from 6-aminehexane acid. (See v. Braun, Berichte 40, page 1840/1907.) Furthermore are included under this heading polymers which are obtained by polymerizing lactams i. e. the monomeric anhydrides of the amino acids instead of the amino acids such as polymerisates obtained from caprolactam, polymerisates from suberonisoxime, polymerisates from the reaction product of 2-methyloxycyclohexanoneoxime, polymerisates of the lactams obtained from the oximes of the isomeric methylcyclohexanones, polymerizates from m-amino phenol hydrochloride and caprolactam polymerizates, $\beta$-p-hydroxy phenyl-ethyl-amine hydrochloride and caprolactam and the like.

Within the scope of this invention fall also the polymerisates from aromatic or aliphatic diamines with polyhalides, for instance the polymerisate from the reaction product of diaminohexane with 1,8-dibromoctane or of cyanuric chloride with diamino hexane.

In order to connect dyestuff formers with such polymerisates, the dyestuff formers must have atoms or atom groups suitable for the reaction with primary and secondary amino groups, for instance carboxyl groups, sulfo groups or halogens. Such dyestuff formers are for instance naphtholsulfo acids, naphthol carboxylic acids, phenol carboxylic acids, cresotic acids with free p-position, xylenol carboxylic acids with p-position either free or substituted by a halogen atom, 1-oxybenzene-2,6-dicarboxylic acid, oxycinnamic acid, 1-oxy-2-methyl-4-brombenzene-6-carboxylic acid, oxycarbazole carboxylic acid, 2-oxydiphenyl carboxylic acid, 2-oxydiphenylmethane dicarboxylic acid, 5-oxytetrahydroquinoline-6-carboxylic acid, also compounds which carry on active methylene group and an acid group, as for instance phenylpyrazolone carboxylic acids, methylnaphthylpyrazolone carboxylic acids, oxythionaphthene carboxylic acids, acetoacetyl anthranilic acids and benzoylacetylamino benzoic acidesters.

The introduction of these compounds into the polymerisate is preferably done over the activated acid group, for instance the acid chlorides or esters, also by means of reactive halogen atoms or by means of aldehyde groups. The reaction is accomplished by known methods, for instance by melting of the polymerisates with acid halides in the presence of an acid binding agent, for instance of a tertiary amine as for instance pyridine or quinoline, if necessary in a nitrogen atmosphere and, if the polymerisate shows too high a melting point, in the presence of a solvent, for instance nitrobenzene, acetophenone, butylacetate, phenylacetate or the coresponding alcohols or high-boiling ethers, as for instance dibutylether and the like. The reaction may be directed by the quantity of the dyestuff former added to the polymerisate for the reaction, so that all reactive amino groups present in the polymerisate, or only part of them, are occupied by a dyestuff-forming molecule. From the number of occupied amino groups depend various properties like solubility and richness of the dyestuff component. By directing the reaction therefore it is possible to obtain the desired degree of solubility or richness of the component.

If for instance the starting material is water soluble as in the case of the polyethyleneimine and the polymethyleneurea, a certain water- and alkali-solubility remains, if only part of the amino groups is condensed with the dyestuff former. If all amino groups are brought into reaction, the formed dyestuff component is practically insoluble in alkalies. The alkali solubility may be effected by sulfurizing, for which in most cases dissolving in concentrated sulfuric acid and precipitating with water is sufficient.

The condensation products from polymerisates and dyestuff formers may be added to the photographic emulsion in aqueous, if necessary alkaline solution at any time in the manufacturing process; if necessary these compounds may be previously dissolved in gelatin solution.

The silver halide emulsion thus obtained, which before casting may be subjected to a short washing process, may be worked up in a manner known per se into photographic emulsion layers, which are arranged on one or both sides of the support, if necessary one on top of the other, and which are sensitized for different regions of the spectrum. The emulsion may also be worked up in a different way, for instance differently sensitized emulsions may be arranged with different dyestuff formers in the form of small particles on a support for photographic emulsions.

The manufacture of color images may be accomplished in various ways, for instance according to the following U. S. patent applications: Ser. No. 10,704, filed March 12, 1935, Patent No. 2,179,228 issued Nov. 7, 1939; Ser. No. 174,350, filed November 13, 1937, Patent No. 2,179,239 issued Nov. 7, 1939; Ser. No. 90,726, filed July 15, 1936, Patent No. 2,178,612 issued Nov. 7, 1939; Ser. No. 94,340, filed August 5, 1936, Patent No. 2,186,849 issued Jan. 9, 1940; and Ser. No. 158,860, filed August 13, 1937, Patent No. 2,179,244 issued Nov. 7, 1939.

*Example I*

15 grams of the condensate obtained from 20 grams polyethyleneimine and 40 grams $\alpha$-oxynaphthoic acid are added to 1 kg. silver halide emulsion in weak alkaline solution. The manufacture of this condensate is done according to the usual, often described laboratory methods from $\alpha$-oxynaphthoic acid chloride and polyethyleneimine. 20 grams of polyethyleneimine are dissolved in 88 cc. quinoline and 40 grams $\alpha$-oxynaphthoic acid chloride are slowly added at a temperature of 130° C. and heated up. After all has been added, the mixture is heated at 180° C. for ten minutes. The melt is stirred, while still warm, into 2 liters of ether, the precipitate sucked off and the melt washed with ether. The reaction product is rubbed with 80 per cent methanol, sucked off and washed with methanol. A white powder is obtained soluble in caustic soda with a weak yellow color. After exposure a layer consisting of this emulsion yields a blue dyestuff image upon development with p-aminodimethylaniline. If the silver image, however, is transformed in a known manner into antidiazotate silver, a red to blue-violet dyestuff image is obtained according to the diazo component employed.

*Example II*

15 grams of the condensation product obtained according to Example I from 40 grams of xylenol carboxylic acid and 20 grams of polymethyleneurea are added to 1 kg. of a silver halide emulsion. If this emulsion is worked up according to Example I, dyestuff images are obtained which resemble in coloring those obtained in Example I.

*Example III*

15 grams of the condensation product obtained according to Example I from 80 grams of α-oxynaphthoic acid and 30 grams of polyethyleneimine which was made soluble in alkali by sulfurizing it afterwards, are added to 1 kg. of a silver halide emulsion. If worked up according to Example I, dyestuff formers corresponding in coloring to those of Example I are obtained. They contain more dyestuff and are of more saturated shades.

*Example IV*

15 grams of the condensation product obtained according to Example I from 30 grams of α-oxynaphthoic acid chloride and 20 grams of "Plastopal" (urea formaldehyde condensation product), are added to 1 kg. of a silver halide emulsion. If worked up as in Example I, dyestuff images corresponding in shade to those of Example I are obtained.

*Example V*

15 grams of a condensation product obtained according to Example I from 20 grams of "Kaurit" (urea-formaldehyde condensation product) and 40 grams of α-oxynaphthoic acid are added to 1 kg. of a silver halide emulsion. If worked up according to Example I, dyestuff images corresponding to those of Example I are obtained.

*Example VI*

15 grams of the condensation product obtained according to Example I from 40 grams of α-oxyanthracene carboxylic acid and 20 grams of polyethyleneimine are added to 1 kg. of a silver halide emulsion. If worked up according to Example I, dyestuff images similar in shade to those of Example I are obtained.

*Example VII*

15 grams of the condensation product obtained according to Example I from 40 grams of 2.3-oxynaphthoic acid and 20 grams of methyleneurea are added to 1 kg. of a silver halide emulsion. After exposure of the cast emulsion the silver halide image is transformed in a known manner into an antidiazotate silver image from which according to the diazo component red to violet azo dyestuff images are obtained.

*Example VIII*

15 grams of the condensation product obtained according to Example I from 40 grams of 2.6-phenol dicarboxylic acid and 20 grams of polyethyleneimine are added to 1 kg. of a silver halide emulsion. If worked up as in Example I, dyestuff images are obtained corresponding in shade and richness to those of Example I.

The compounds produced according to Examples 2, 4, 5, 6 and 8 may be improved with regard to their solubility in diluted alkalies by dissolving the same in concentrated sulfuric acid at 40–50° C. and precipitating while stirring into ice.

*Example IX*

15 grams of the condensation product obtained according to Example I from 40 grams of α-oxynaphthoic acid and 20 grams of the polymerisate from adipic acid and hexamethylenediamine are added to 1 kg. of a silver halide emulsion. If the layers are worked up as in Example I, dyestuff images are obtained corresponding to those of Example I.

*Example X*

15 grams of the condensation product obtained according to Example I from 40 grams of xylenol carboxylic acid and from 20 grams of the polymerisate from caprolactam are added to 1 kg. of a silver halide emulsion. If worked up as in Example I, dyestuff images corresponding to those of Example I are obtained.

*Example XI*

15 grams of the condensation product obtained according to Example I from 40 grams of 2-oxydiphenyl carboxylic acid and 10 grams of the polymerisate from sebacic acid and octylenediamine are added to 1 kg. of a silver halide emulsion. If worked up as in Example I, dyestuff images are obtained similar to those of Example I.

*Example XII*

15 grams of the condensation product obtained according to Example I from 40 grams of 1-oxy-2-methyl-4-brombenzene-6-carboxylic acid and 20 grams of methyleneurea are added to 1 kg. of a silver halide emulsion. If worked up as in Example I, dyestuff images similar to those of Example I are obtained.

*Example XIII*

15 grams of the condensation product obtained according to Example I from 40 grams of 1-phenyl-3-methyl-5-pyrazolone-3'-carboxylic acid and 40 grams of polyethyleneimine are added to 1 kg. of a silver halide emulsion. If the layers are worked up according to Example I, red or yellow dyestuff images are obtained.

*Example XIV*

15 grams of the condensation product obtained according to Example I from 40 grams of acetoacetylaminophenyl-4-carboxylic acid and 40 grams of polyethyleneimine are added to 1 kg. of a silver halide emulsion. If worked up according to Example I, yellow dyestuff images are obtained.

What we claim is:

1. Silver halide emulsion for color photography containing a color forming component consisting of the condensation product from a resinous polymer having the recurring structural unit —CO—NH— and a compound capable of forming a dyestuff selected from the class consisting of quinoneimine-, azomethine-, and azo-dyestuffs with the oxidation product of an aromatic amino developing agent, said condensation product containing at least one grouping selected from the class consisting of —CO—, —SO$_2$—, ≡C— and —CH= for linking a —NH— group of said polymer radical to said compound capable of forming a dyestuff.

2. Silver halide emulsions for color photography containing a color former consisting of a resin having recurring nitrogen containing groups and selected from the class consisting of the polyalkylene imines, polyamine-aldehydes, superpolyamides and polyamine-polyhalides, said resin having linked to recurring nitrogen atoms thereof a compound capable of forming a dyestuff selected from the class consisting of quinone-imine-, azomethine and azo-dyestuffs, with the oxidation products of an aromatic amino developer.

3. Silver halide emulsions as defined in claim 2, wherein the linkage between said resin and said compound capable of forming a dyestuff is selected from the class of a direct carbon to nitrogen linkage, a methine linkage, a carbonyl linkage and a sulfonyl linkage.

4. Silver halide emulsions for color photography containing a color former consisting of the condensation product of polyethyleneimine with a phenol carboxylic acid.

5. Silver halide emulsions for color photography containing a color former consisting of the condensation product of a urea formaldehyde resin with a phenol carboxylic acid.

6. Silver halide emulsions for color photography containing a color former consisting of the condensation product of a superpolyamide with a phenol carboxylic acid.

7. Silver halide emulsions as defined in claim 4 wherein the phenol carboxylic acid is alpha-hydroxynaphthoic acid.

8. Silver halide emulsions as defined in claim 5 wherein the phenol carboxylic acid is alpha-hydroxynaphthoic acid.

9. Silver halide emulsions as defined in claim 6 wherein the superpolyamide is the reaction product of adipic acid and hexamethylenediamine and the phenol carboxylic acid is alpha-hydroxynaphthoic acid.

ALFRED FRÖHLICH.
WILHELM SCHNEIDER.

CERTIFICATE OF CORRECTION.

Patent No. 2,307,399.　　　　　　　　　　　　　　　January 5, 1943.

ALFRED FRÖHLICH, ET AL.

It is hereby certified that error appears in the printed specification of the above numbered patent requiring correction as follows: Page 2, first column, line 16, for "methyloxyclohexanoneoxime" read --methyloxycyclohexanoneoxime--; and second column, line 54, for "88 cc. quinoline" read --80 cc. quinoline--; and that the said Letters Patent should be read with this correction therein that the same may conform to the record of the case in the Patent Office.

Signed and sealed this 2nd day of March, A. D. 1943.

(Seal)　　　　　　　　　　　　　　　　　　　Henry Van Arsdale,
　　　　　　　　　　　　　　　　　　　Acting Commissioner of Patents.